(12) United States Patent
Nagatani et al.

(10) Patent No.: US 9,817,270 B2
(45) Date of Patent: Nov. 14, 2017

(54) PHOSPHOR SHEET, LIGHT EMITTING UNIT, AND DISPLAY UNIT

(71) Applicant: Sony Corporation, Tokyo (JP)

(72) Inventors: Shinpei Nagatani, Kanagawa (JP); Yasuhiro Nishida, Kanagawa (JP); Kenji Kobayashi, Kanagawa (JP)

(73) Assignee: Sony Corporation (JP)

( * ) Notice: Subject to any disclaimer, the term of this patent is extended or adjusted under 35 U.S.C. 154(b) by 185 days.

(21) Appl. No.: 14/311,715

(22) Filed: Jun. 23, 2014

(65) Prior Publication Data
US 2015/0009454 A1   Jan. 8, 2015

(30) Foreign Application Priority Data

Jul. 3, 2013  (JP) ................................. 2013-140066

(51) Int. Cl.
| | | |
|---|---|---|
| G02F 1/1335 | (2006.01) | |
| F21V 8/00 | (2006.01) | |
| F21S 6/00 | (2006.01) | |
| F21V 9/16 | (2006.01) | |
| F21S 8/00 | (2006.01) | |
| F21S 8/04 | (2006.01) | |
| F21Y 105/00 | (2016.01) | |
| F21Y 103/10 | (2016.01) | |
| F21Y 115/10 | (2016.01) | |

(52) U.S. Cl.
CPC ........ *G02F 1/133617* (2013.01); *F21S 6/002* (2013.01); *F21S 8/03* (2013.01); *F21S 8/04* (2013.01); *F21V 9/16* (2013.01); *G02B 6/005* (2013.01); *F21Y 2103/10* (2016.08); *F21Y 2105/00* (2013.01); *F21Y 2115/10* (2016.08); *G02F 1/133615* (2013.01); *G02F 2001/133614* (2013.01); *Y10T 428/24198* (2015.01)

(58) Field of Classification Search
None
See application file for complete search history.

(56) References Cited

U.S. PATENT DOCUMENTS

| | | | | |
|---|---|---|---|---|
| 2006/0049370 | A1* | 3/2006 | Shoji | G21K 4/00 250/581 |
| 2006/0268537 | A1* | 11/2006 | Kurihara | G02B 6/0023 362/34 |
| 2007/0063155 | A1* | 3/2007 | Fukui | C09K 11/7733 250/484.4 |
| 2008/0179533 | A1* | 7/2008 | Nagata | G01T 1/2002 250/370.11 |
| 2010/0238381 | A1* | 9/2010 | Oshima | G02F 1/133603 349/71 |

(Continued)

FOREIGN PATENT DOCUMENTS

JP    2013-032515 A    2/2013

*Primary Examiner* — Edward Glick
*Assistant Examiner* — Shan Liu
(74) *Attorney, Agent, or Firm* — Lerner, David, Littenberg, Krumholz & Mentlik, LLP

(57) ABSTRACT

A phosphor sheet includes: a stacked structure including a first phosphor layer and a pair of transparent films each being in contact with either side of the first phosphor layer; a seal layer integrally covering an area from an end face of the stacked structure to a periphery of the stacked structure; and a second phosphor layer further covering a portion of the seal layer, the portion covering at least the periphery of the stacked structure.

8 Claims, 14 Drawing Sheets

(56) References Cited

U.S. PATENT DOCUMENTS

| | | | |
|---|---|---|---|
| 2011/0002140 A1* | 1/2011 | Tsukahara | G02B 5/0236 362/602 |
| 2011/0037926 A1* | 2/2011 | Tsukahara | G02B 6/0023 349/64 |
| 2012/0236587 A1* | 9/2012 | Kim | B23K 26/0604 362/602 |
| 2014/0097461 A1* | 4/2014 | Ito | C09K 11/02 257/98 |
| 2014/0319995 A1* | 10/2014 | Kim | G02F 1/133512 313/501 |
| 2016/0137918 A1* | 5/2016 | Hori | C09K 11/7731 428/1.1 |

\* cited by examiner

PHOSPHOR SHEET, LIGHT EMITTING UNIT, AND DISPLAY UNIT

CROSS REFERENCE TO RELATED APPLICATIONS

This application claims the benefit of Japanese Priority Patent Application JP 2013-140066 filed Jul. 3, 2013, the entire contents of which are incorporated herein by reference.

BACKGROUND

The present disclosure relates to a phosphor sheet containing a phosphor that fluoresces when irradiated with light, and a light emitting unit including the phosphor sheet, and a display unit including the phosphor sheet.

In general, a liquid crystal display includes a backlight light source that illuminates the entire liquid crystal panel from the back. Recently, the liquid crystal display has been increased in size, reduced in thickness and weight, or increased in life. Along with this, and in light of improvement of moving picture characteristics by flashing control, attention has been focused on a light emitting unit in which a plurality of light emitting diodes (LEDs) are provided on a substrate for surface emission. In such a light emitting unit, the following techniques are used to extract white light.

In a first technique, three colors of LEDs emitting light of R (red), G (green), and B (blue) are arranged, and when the LEDs are simultaneously turned on, the three colors of light are synthesized and white light is produced. In a second technique, for example, a blue LED is enclosed by a phosphor-containing resin so that blue light is color-converted into white light. Such a structure where the blue LED is enclosed by the phosphor-containing resin is called white LED.

Alternatively, as a third technique, there is proposed a technique where a phosphor-containing sheet, such as a sheet including a phosphor-containing resin sandwiched by sheet substrates or a sheet including a phosphor-containing resin formed into a sheet shape, is used to perform color conversion using blue LED (for example, see Japanese Unexamined Patent Application Publication No. 2013-32515). In addition, there is proposed a structure including a phosphor-containing resin sandwiched by two glass plates.

SUMMARY

However, if water enters the phosphor-containing sheet, quality of the phosphor material is changed. As a result, a desired wavelength conversion function may not be provided. In addition, recent demands for high display quality of a display unit become higher, and expansion of a color reproduction range is also demanded in addition to increase in luminance.

It is desirable to provide a phosphor sheet having high moisture resistance and an excellent wavelength conversion efficiency. It is further desirable to provide a light emitting unit that includes such a phosphor sheet, and thus has a high luminous efficiency and high luminous color purity. It is further desirable to provide a display unit showing high emission luminance and having a wide color reproduction range.

According to an embodiment of the present disclosure, there is provided a phosphor sheet, including: a stacked structure including a first phosphor layer and a pair of transparent films each being in contact with either side of the first phosphor layer; a seal layer integrally covering an area from an end face of the stacked structure to a periphery of the stacked structure; and a second phosphor layer further covering a portion of the seal layer, the portion covering at least the periphery of the stacked structure.

According to an embodiment of the present disclosure, there is provided a light emitting unit, including: a light source; a light guide plate having a first main surface and a second main surface opposed to each other, and an end face connecting the first main surface to the second main surface and being opposed to the light source; and a phosphor sheet opposed to the first main surface of the light guide plate, wherein the phosphor sheet includes a stacked structure including a first phosphor layer and a pair of transparent films each being in contact with either side of the first phosphor layer, a seal layer integrally covering an area from an end face of the stacked structure to a periphery of the stacked structure, and a second phosphor layer further covering a portion of the seal layer, the portion covering at least the periphery of the stacked structure.

According to an embodiment of the present disclosure, there is provided a display unit, including: a liquid crystal panel; and a light emitting unit disposed to be opposed to a back of the liquid crystal panel, wherein the light emitting unit includes a light source, a light guide plate having a first main surface and a second main surface opposed to each other, and an end face connecting the first main surface to the second main surface and being opposed to the light source, and a phosphor sheet opposed to the first main surface of the light guide plate, wherein the phosphor sheet includes a stacked structure including a first phosphor layer and a pair of transparent films each being in contact with either side of the first phosphor layer, a seal layer integrally covering an area from an end face of the stacked structure to a periphery of the stacked structure, and a second phosphor layer further covering a portion of the seal layer, the portion covering at least the periphery of the stacked structure.

In the phosphor sheet, the light emitting unit, and the display unit according to the above-described embodiments of the present disclosure, since the end face and the periphery of the stacked structure of the first phosphor layer and the pair of transparent films are integrally covered with the seal layer, water is prevented from entering the first phosphor layer. Furthermore, since the second phosphor layer is provided on part or all of the seal layer, it is also possible to perform wavelength conversion on incident light in the periphery of the stacked structure covered with the seal layer.

According to the phosphor sheet of the embodiment of the present disclosure, it is possible to highly efficiently perform wavelength conversion on incident light also using the second phosphor layer while preventing degradation of the first phosphor layer. According to the light emitting unit including the phosphor sheet of the embodiment of the present disclosure, high luminous efficiency and high luminous color purity are provided. Furthermore, according to the display unit of the embodiment of the present disclosure, excellent display performance including high emission luminance and a wide color reproduction range is exhibited.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinafter, some embodiments of the present disclosure will be described in detail with reference to the accompanying drawings. It is to be noted that description is made in the following order.

1. First embodiment

A phosphor sheet in which a second phosphor layer is provided on a seal layer covering the periphery of a stacked structure including a first phosphor layer, and a light emitting unit having the phosphor sheet.

2. Second embodiment

A phosphor sheet in which a light reflecting layer and a second phosphor layer are provided in order on a seal layer covering the periphery of a stacked structure including a first phosphor layer, and a light emitting unit including the phosphor sheet.

3. Third embodiment

A display unit (liquid crystal display unit) including one of the light emitting units.

4. Application examples 1 to 6 of display unit

5. Application examples 7 to 9 of lighting unit

First Embodiment

[Configuration of Light Emitting Unit 1]

Figure 1:
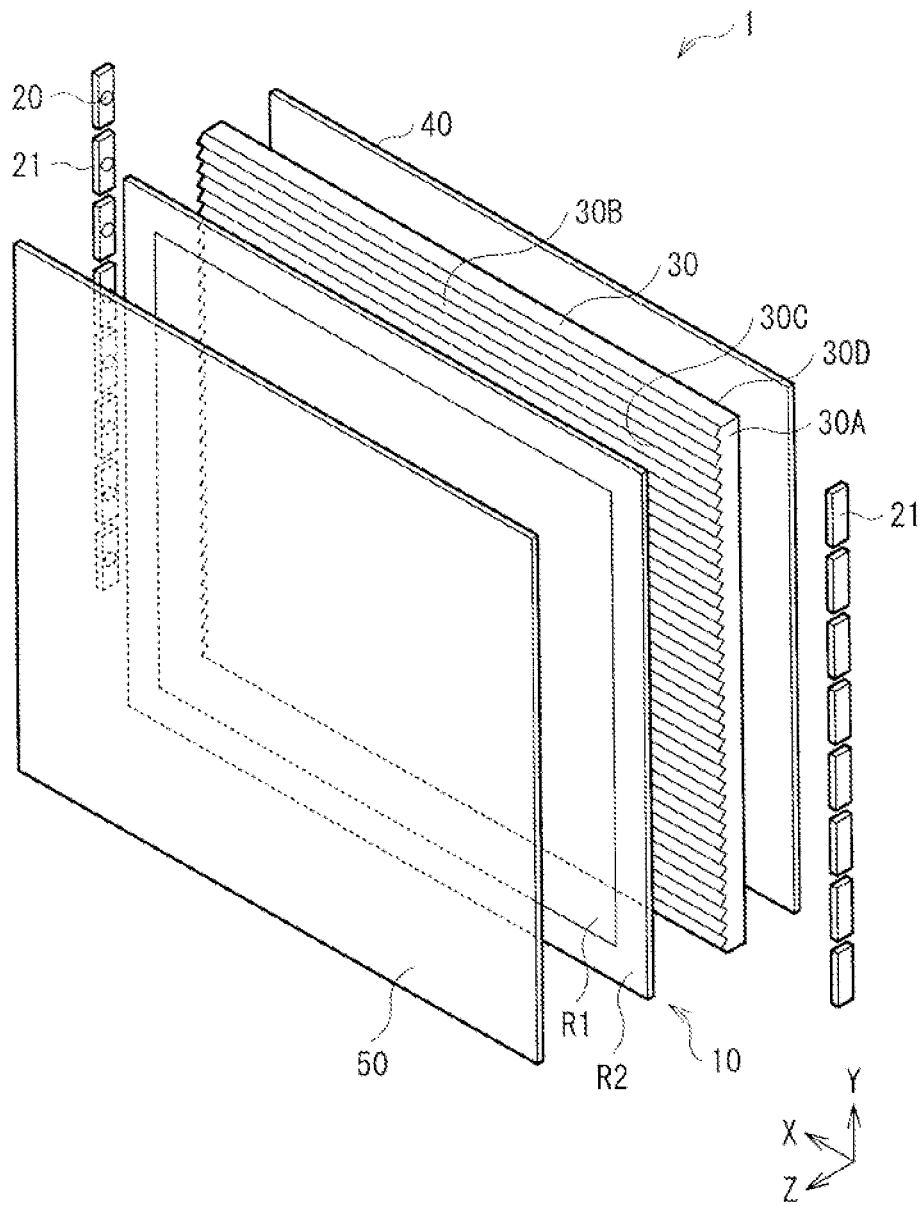
FIG. 1 is a perspective diagram illustrating an exemplary overall configuration of a light emitting unit including a phosphor sheet according to a first embodiment of the present disclosure.
Figure 2:
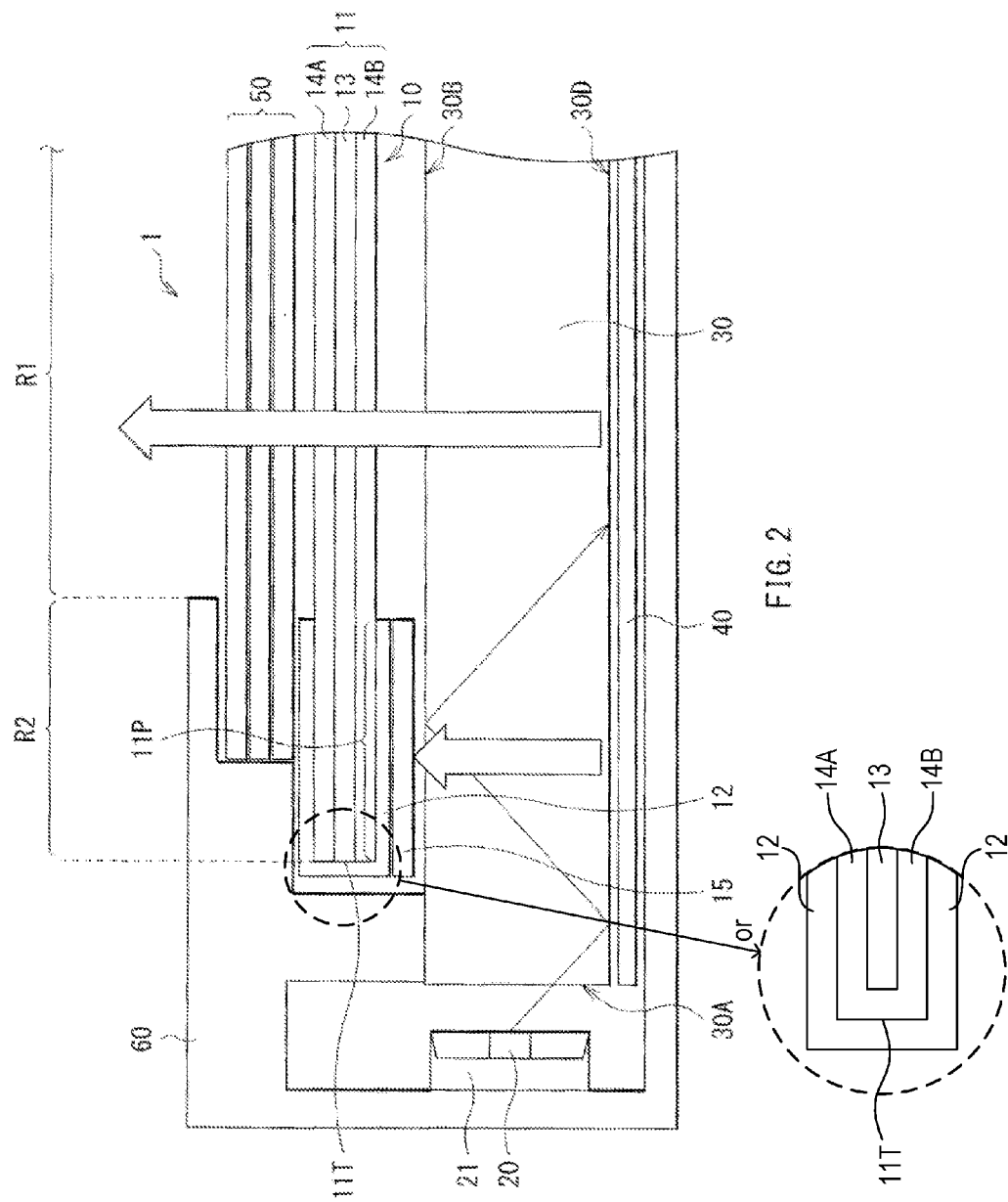
FIG. 2 is a sectional diagram illustrating a configuration of a main part of the light emitting unit illustrated in FIG. 1.

FIG. 1 illustrates an overall configuration of a light emitting unit 1 including a phosphor sheet 10 as a first embodiment of the present disclosure. FIG. 2 illustrates in enlarged dimension a section of a main part of the light emitting unit 1. For example, the light emitting unit 1 may be used as a backlight that illuminates a transmissive liquid crystal panel from the back, or used as a lighting unit in a room or the like. The light emitting unit 1 includes a light source 20, a light guide plate 30, a reflective component 40, and optical sheets 50 in addition to the phosphor sheet 10 in a housing 60 (omitted in FIG. 1, and illustrated in FIG. 2).

In this specification, a stacked direction of the optical sheets 50, the phosphor sheet 10, the light guide plate 30, and the reflective component 40 is defined as a Z direction (front-back direction), and a horizontal direction on a main surface (a widest surface) of the light guide plate 30 is defined as an X direction, and a vertical direction is defined as a Y direction.

The phosphor sheet 10 includes a stacked structure 11, and a bezel-like seal layer 12 integrally covering an area from an end face 11T of the stacked structure 11 to a periphery 11P of the stacked structure 11. In the stacked structure 11, the periphery 11P having the seal layer 12 thereon is located in a light-shielding region R2 in which light, which is emitted from the light source 20 and passes through the light guide plate 30, is not transmitted by the stacked structure 11, i.e., shielded. On the other hand, in the stacked structure 11, a region other than the region having the seal layer 12 corresponds to a light emitting region R1 in which light, which is emitted from the light source 20, travels through the light guide plate 30 and arrives at the stacked structure 11, is wavelength-converted and emitted as converted light to the outside.

The stacked structure 11 includes a first phosphor layer 13, and a pair of transparent films 14A and 14B each being in tight contact with either side of the first phosphor layer 13. A portion of the seal layer 12, which covers at least the periphery 11P of the stacked structure 11 and is opposed to the light guide plate 30, is further covered with a second phosphor layer 15. Although FIG. 2 exemplifies a case where the stacked structure 11 has a three-layer structure, the stacked structure 11 may further include another layer.

For example, the first phosphor layer 13 may perform wavelength conversion on blue excitation light of a blue light emitting element into white light, and may be configured of a resin composite containing powdered phosphor. For example, the phosphor powder may preferably have an average particle diameter of several micrometers to several tens of micrometers. This is because such an average particle diameter allows the light scattering effect of the first phosphor layer 13 to be improved. A sulfide phosphor is preferable as the phosphor contained in the first phosphor layer 13. This is because the sulfide phosphor allows higher luminous efficiency and higher luminous color purity to be provided. However, oxide phosphor, or mixed phosphor of sulfide phosphor and oxide phosphor may also be used.

The sulfide phosphor may include a sulfide phosphor having a red fluorescent peak of 620 nm to 660 nm both inclusive in wavelength when irradiated with blue exciting light, and a sulfide-based phosphor having a green fluorescent peak of 530 nm to 550 nm both inclusive in wavelength when irradiated with blue exciting light. Specifically, CaS: Eu (CaS indicates a matrix material, and Eu indicates an activator, and the same holds true below.) or SrS: Eu is preferable as the former, while $SrGa_2S_4$: Eu is preferable as the latter.

The oxide phosphor may include an oxide phosphor, which emits red fluorescent light having a wavelength of 590 nm to 620 nm both inclusive when irradiated with blue exciting light, preferably including $(BaSr)_3SiO_5$: Eu, $(BaSr)_2SiO_4$: Eu, and the like.

Phosphors other than the sulfide phosphor and the oxide phosphor are usable, examples of which may include yttrium-aluminum-garnet (YAG) phosphor such as $(YGd)_2(AlGa)_5O_{12}$: Ce, sialon phosphor, and the like.

The first phosphor layer 13 may have a single-layered structure or a multilayered structure. In the case where the first phosphor layer 13 has a single-layered structure, a mixed phosphor described below is preferably used to allow the first phosphor layer 13 to emit white light when irradiated with blue exciting light. For example, the mixed phosphor may include one of a sulfide phosphor and an oxide phosphor, which emit light having a wavelength of 620 nm to 660 nm both inclusive and light having a wavelength of 590 nm to 620 nm both inclusive, respectively, when irradiated with blue exciting light, and a sulfide phosphor that emits light having a wavelength of 530 nm to 550 nm both inclusive when irradiated with blue exciting light. A mixed phosphor with a particularly preferred phosphor combination is a mixed phosphor of CaS: Eu or $(BaSr)_3SiO_5$: Eu emitting red fluorescent light and $SeGa_2S_4$: Eu emitting green fluorescent light.

In the case where the first phosphor layer 13 has a double-layered structure, a stacked structure of a first layer and a second layer as described below is preferably used to allow the first phosphor layer 13 to emit white light when irradiated with blue exciting light. Specifically, for example, the first layer may contain one of a sulfide phosphor and an oxide phosphor, which emit light having a wavelength of 620 nm to 660 nm both inclusive and light having a wavelength of 590 nm to 620 nm both inclusive, respectively, when irradiated with blue exciting light. The second layer may contain a sulfide phosphor emitting light having a wavelength of 530 nm to 550 nm both inclusive when irradiated with blue exciting light. Particularly preferred is a double-layered structure of a phosphor layer containing CaS: Eu or $(BaSr)_3SiO_5$: Eu emitting red fluorescent light and a phosphor layer containing $SrGa_2S_4$: Eu emitting green fluorescent light.

Polyolefin copolymer, photo-curable (meta) acrylic resin, or the like may be used as a resin composite configuring the first phosphor layer 13. Another light-transmissive resin, a color pigment, a solvent, and the like may be mixed to the resin composite as necessary.

For example, the pair of transparent films 14A and 14B may be configured of a moistureproof transparent resin such as polyethylene terephthalate (PET). Each of the transparent films 14A and 14B is in tight contact with the first phosphor layer 13 without clearances by thermocompression bonding, for example.

The seal layer 12 is configured of a highly moistureproof material. Examples of the material may include a metal tape made of aluminum or the like.

Figure 3:
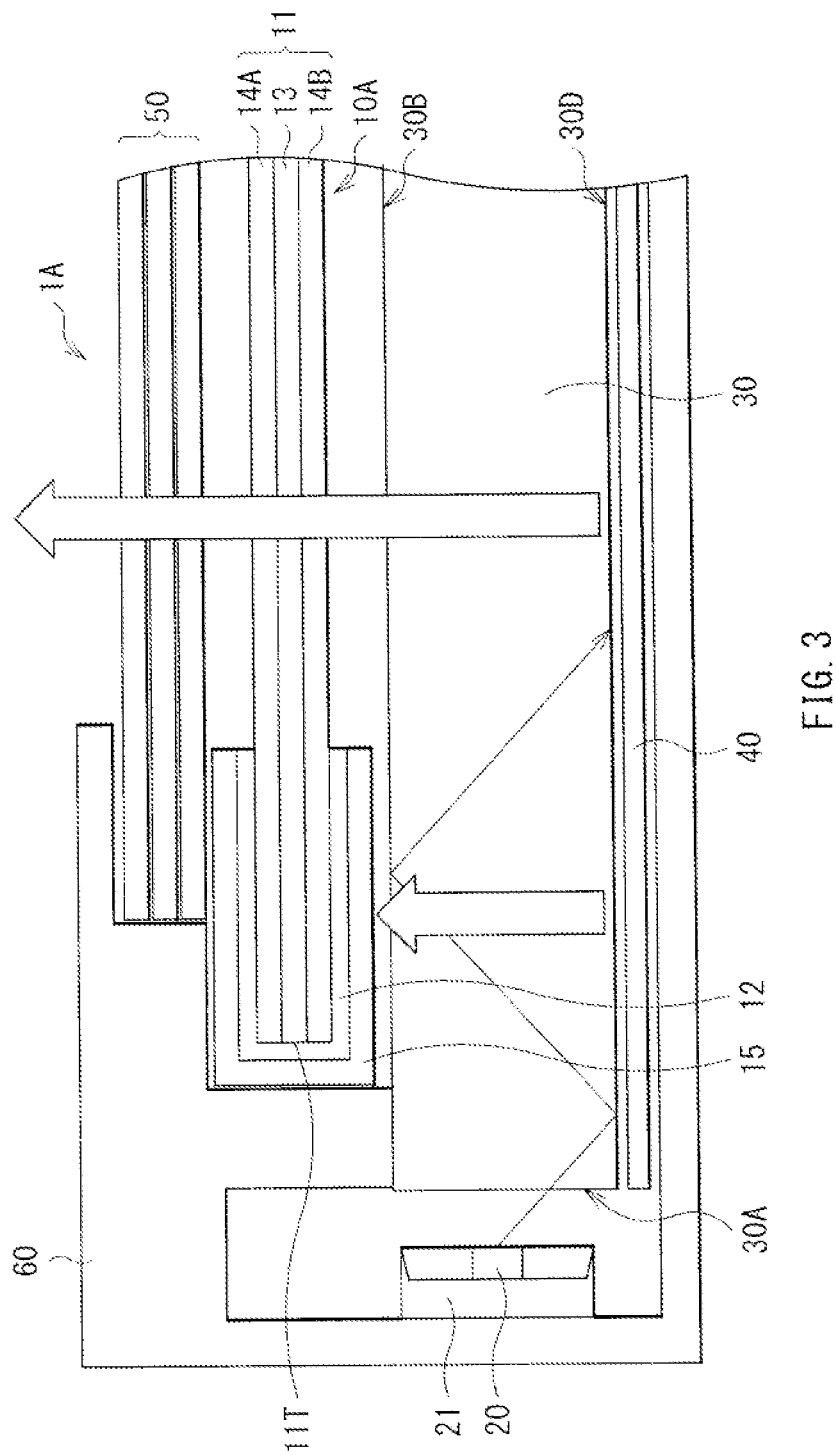
FIG. 3 is a sectional diagram illustrating a modification of the light emitting unit according to the first embodiment illustrated in FIG. 1.

As with the first phosphor layer 13, the second phosphor layer 15 has a function of performing wavelength conversion on blue excitation light of a blue light emitting element into white light. The second phosphor layer 15 is configured of a material including the above-described YAG-based phosphor that is less likely to be degraded or degenerated by water. In the first embodiment, the second phosphor layer 15 is selectively provided only in a portion of the seal layer 12, the portion covering the transparent film 14B. However, the second phosphor layer 15 may be provided so as to cover the entire surface of the seal layer 12 as in a light emitting unit 1A including a phosphor sheet 10A illustrated in FIG. 3 as a modification of the first embodiment.

For example, the light source 20 may be a point light source configured of a light emitting diode (LED) emitting blue light. For example, a plurality of light sources 20 may be provided along the Y direction. For example, each light source 20 may be sealed within a package (undepicted in FIG. 1, see FIG. 2) and mounted in the housing 60, and disposed to be opposed to a light-incident surface 30A (for example, each horizontal end face in FIG. 1) of the light guide plate 30 in the X direction. The plurality of packages 21 are arranged in a line along the Y direction, each of which has a rectangular solid shape with the arranged direction (Y direction) as a longitudinal direction.

For example, the light guide plate 30 may be a component of a rectangular solid shape configured of a pair of main faces (a surface and a back) opposed in the front-back direction (Z direction) and four end faces (side faces) connecting four sides of one of the main faces to four sides of the other of the main faces. In this exemplary case, one or more of the four end faces is configured as the light-incident surface 30A opposed to the light source 20. All the four end faces may be configured as the light-incident surfaces 30A, or appropriate two or three of the four end faces may be configured as the light-incident surfaces 30A.

The surface of the main faces of the light guide plate 30 is configured as a light-emitting surface 30B, and the back thereof is configured as a light-emitting surface 30D. The light-emitting surface 30B and the light-emitting surface 30D are desirably parallel to each other. The light guide plate 30 guides light from the light source 20 from the light-incident surface 30A to the light-emitting surface 30B, and, for example, may mainly include a transparent thermoplastic resin such as polycarbonate resin (PC) or acrylic resin (for example, polymethyl methacrylate (PMMA)). For example, each of the light-emitting surface 30B (surface) and the light-emitting surface 30D (back) of the light guide plate 30 may have a planar shape corresponding to an illuminated object (for example, a liquid crystal panel 122 described later) disposed to be opposed to the light-emitting surface 30B of the light guide plate 30. For example, the light-emitting surface 30B (surface) of the light guide plate 30 may preferably have a concavo-convex pattern configured of fine convex portions 30C in order to improve straight advance performance of light propagated through the light guide plate 30. For example, the convex portions 30C are each a beltlike, linear protrusion or ridge extending in one direction (for example, horizontal direction) of the light-emitting surface 30B. The light-emitting surface 30B is spaced away from and opposed to the transparent film 14B and the second phosphor layer 15. On the light-emitting surface 30D (back) of the light guide plate 30, for example, a scattering agent may be printed in a pattern as a scattering section that scatters and equalizes light propagated through the light guide plate 30. As the scattering section, a region containing fillers may be provided in place of the scattering agent, or a surface may be partially roughened.

The reflective component 40 is a plate-like or sheet-like component provided to be opposed to the light-emitting surface 30D (back) of the light guide plate 30, and returns light, which enters the light guide plate 30 from the light source 20 and then leaks out from the light-emitting surface 30D, or light, which is emitted from the inside of the light guide plate 30 through the light-emitting surface 30D, to the light guide plate 30. For example, the reflective component 40 may have functions of reflection, diffusion, scattering, etc., and thus allows light from the light source to be efficiently used so that front luminance is increased.

For example, the reflective component 40 may be configured of foamed polyethylene terephthalate (PET), a silver-evaporated film, a multilayered reflection film, or white PET. In the case where the reflective component 40 is allowed to have a function of regular reflection (mirror reflection), the surface of the reflective component 40 is preferably subjected to treatment of silver evaporation, aluminum evaporation, multilayered reflection, or the like. When a fine pattern is added to the reflective component 40, the reflective component 40 may be integrally formed by a technique such as heat press molding or melt extrusion molding using thermoplastic resin. Alternatively, for example, an energy-ray (for example, ultraviolet ray) curable resin may be applied onto a substrate configured of PET or the like, and then a pattern may be transferred onto the energy-ray curable resin to form the fine pattern. Examples of the thermoplastic resin may include polycarbonate resin, acrylic resin such as polymethyl methacrylate (PMMA) resin, polyester resin such as polyethylene terephthalate, amorphous copolymeric polyester resin such as copolymer of methyl methacrylate and styrene (MS), polystyrene resin, and polyvinyl chloride resin. In the case where a pattern is transferred onto the energy-ray (for example, ultraviolet ray) curable resin, the substrate may be a glass substrate.

The optical sheets 50 are provided to be opposed to the light-emitting surface 30B (surface) of the light guide plate 30, and, for example, may include a diffuser plate, a diffuser sheet, a lens film, a polarization separation sheet, and the like. FIG. 1 illustrates only one of the plurality of optical sheets 50. Such optical sheets 50 are provided, thereby light, which is obliquely emitted from the light guide plate 30, is allowed to be risen in a front direction, and therefore front luminance is further increased.

As illustrated in FIG. 2, any of the phosphor sheet 10, the light source 20, the light guide plate 30, the reflective component 40, and the optical sheets 50 is held by the housing 60. For example, the housing 60 may be configured of highly reflective polycarbonate resin or polyamide resin.

[Functions and Effects of Light Emitting Unit 1]

In the light emitting unit 1, light (for example, blue light) emitted from the light source 20 enters the light guide plate 30 from the light-incident surface 30A. The light advances through the inside of the light guide plate 30 and is then emitted from the light-emitting surface 30B. The light (blue light) emitted from the light-emitting surface 30B is wavelength-converted into white light by the first phosphor layer 13 of the phosphor sheet 10. The white light passes through the optical sheets 50 and is externally observed.

Part of the light (blue light) emitted from the light-emitting surface 30B is wavelength-converted into white light by the second phosphor layer 15 provided on the seal layer 12 covering the periphery 11P of the stacked structure 11. If the second phosphor layer 15 is not provided, light (blue light), which is emitted from the light-emitting surface 30B and irradiates the seal layer 12 covering the periphery 11P, is not wavelength-converted and enters the light emitting region R1, for example. As a result, slightly bluish light may be observed in a frame pattern along a boundary between the light emitting region R1 and the light-shielding region R2. However, the second phosphor layer 15 is provided as in the first embodiment, thereby incident light (blue light) on the light-shielding region R2 is allowed to be wavelength-converted into white light; hence, it is possible to suppress occurrence of color unevenness in a frame pattern as described above.

In the phosphor sheet 10, since the end face 11T and the periphery 11P of the stacked structure 11 of the first phosphor layer 13 and the pair of transparent films 14A and 14B sandwiching the first phosphor layer 13 are integrally covered with the seal layer 12, water is prevented from entering the first phosphor layer 13. It is therefore possible to use the sulfide phosphor, which is relatively bad in moisture resistance but is excellent in luminous efficiency and luminous color purity, for the first phosphor layer 13. Consequently, if the phosphor sheet 10 is used in a display unit, the display unit is allowed to exhibit excellent display performance including high emission luminance and a wide color reproduction range. In a possible technique, a marginal portion protruded from the first phosphor layer 13 is provided on an outer edge of each of the pair of transparent films 14A and 14B sandwiching the first phosphor layer 13, and such marginal portions are fused to each other to seal the first phosphor layer 13. In such a case, however, wavelength conversion is not performed in the marginal portion. In the first embodiment, the light-shielding region R2 has a smaller areal occupancy than the marginal portion, which is advantageous in compactness.

Second Embodiment

[Configuration of Light Emitting Unit 2]

Figure 4:
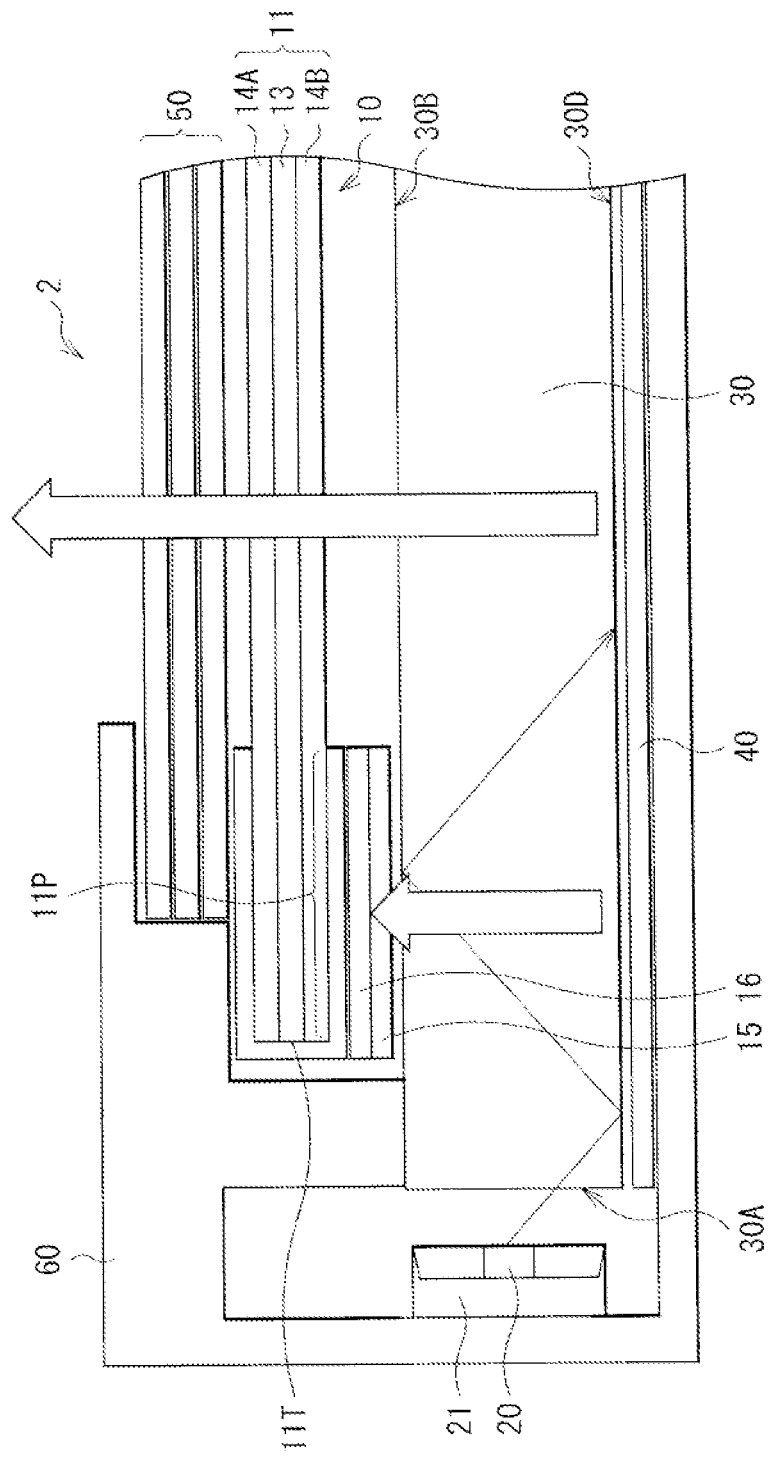
FIG. 4 is a sectional diagram illustrating a configuration of a light emitting unit according to a second embodiment of the present disclosure.

FIG. 4 illustrates a main-part sectional configuration of a light emitting unit 2 as a second embodiment of the present technology. In the light emitting unit 2, the phosphor sheet 10 has a light reflecting layer 16 between the seal layer 12 and the second phosphor layer 15. The light emitting unit 2 has a configuration similar to that of the light emitting unit 1 of the first embodiment except for such a point. For example, the light reflecting layer 16 may be configured of a material having a high reflectance such as a metal material such as aluminum and silver, or white resin.

[Functions and Effects of Light Emitting Unit 2]

Such a light emitting unit 2 is also allowed to exhibit functions similar to those of the light emitting unit of the first embodiment. Moreover, the second phosphor layer 15 is allowed to highly efficiently perform wavelength conversion regardless of material of the seal layer 12. Specifically, it is possible that the light reflecting layer 16 is configured of a material having more excellent light-reflective performance while the seal layer 12 is configured of a material having more excellent moistureproof performance.

Third Embodiment

Figure 5:
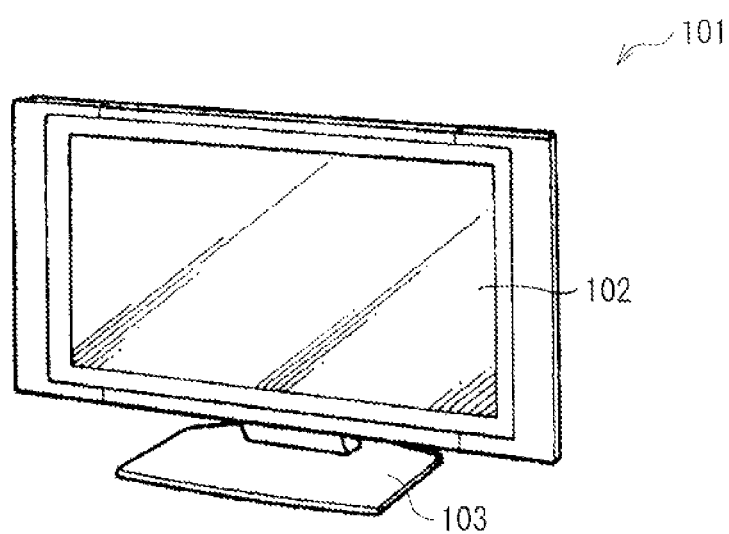
FIG. 5 is a perspective diagram illustrating appearance of a display unit according to a third embodiment of the present disclosure.

FIG. 5 illustrates appearance of a display unit 101 according to a third embodiment of the present technology. The display unit 101 includes the light emitting unit 1, and, for example, may be used as a flat television unit. The display unit 101 has a configuration where a flat-plate-like body section 102 for image display is supported by a stand 103. The display unit 101 is placed on a horizontal plane such as a floor, a shelf, or a table and is used as a stationary type while the stand 103 is attached to the body section 102. However, the display unit 101 may be used as a wall-hung type while the stand 103 is in a detached state from the body section 102.

Figure 6:
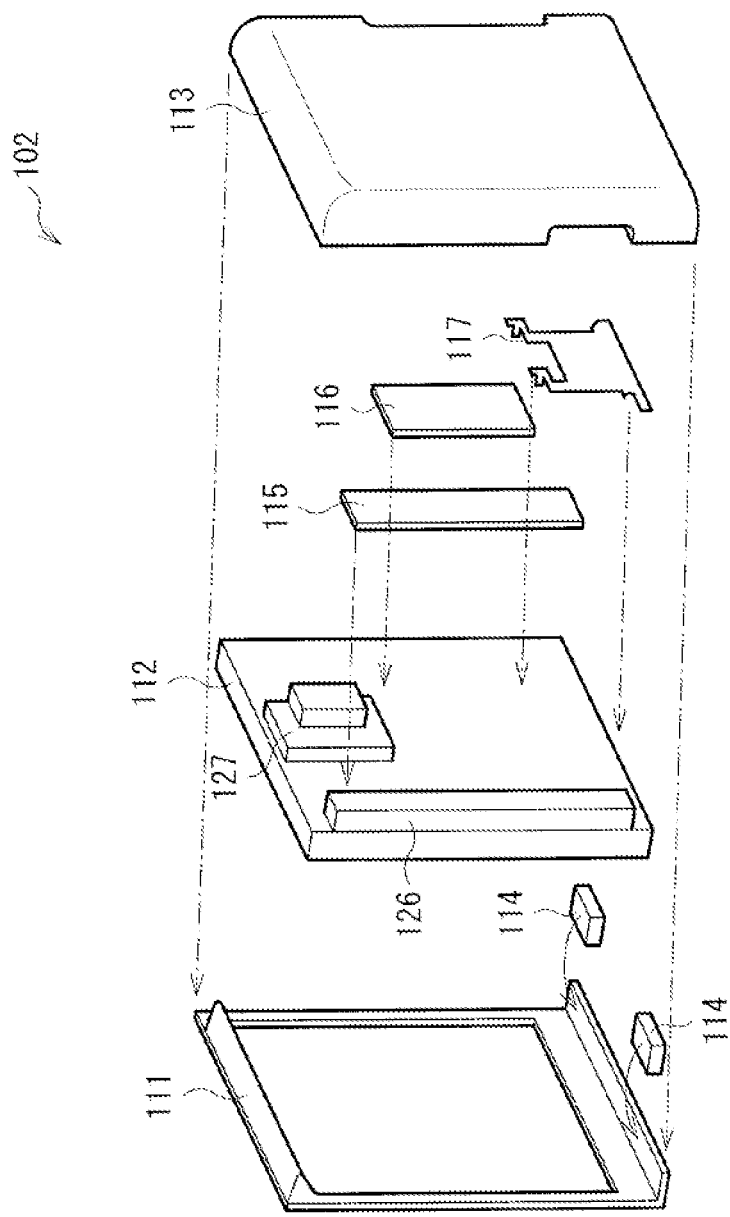
FIG. 6 is a perspective diagram illustrating a body section illustrated in FIG. 5 in an exploded manner.

FIG. 6 illustrates the body section 102 illustrated in FIG. 5 in an exploded manner. For example, the body section 102 may include a front packaging component (bezel) 111, a panel module 112, and a rear packaging component (rear cover) 113 in this order from a front side (viewer side). The front packaging component 111 is a bezel-like component covering the front periphery of the panel module 112. A pair of speakers 114 are disposed below the front packaging component 111. The panel module 112 is fixed to the front packaging component 111. A power supply substrate 115 and a signal substrate 116 are mounted on the back of the panel module 112, and a fitting 117 is fixed to the back of the panel module 112. The fitting 117 is provided for attachment of each of a wall-hung bracket, a substrate or the like, and the stand 103. The rear packaging component 113 covers the back and the side faces of the panel module 112.

Figure 7:
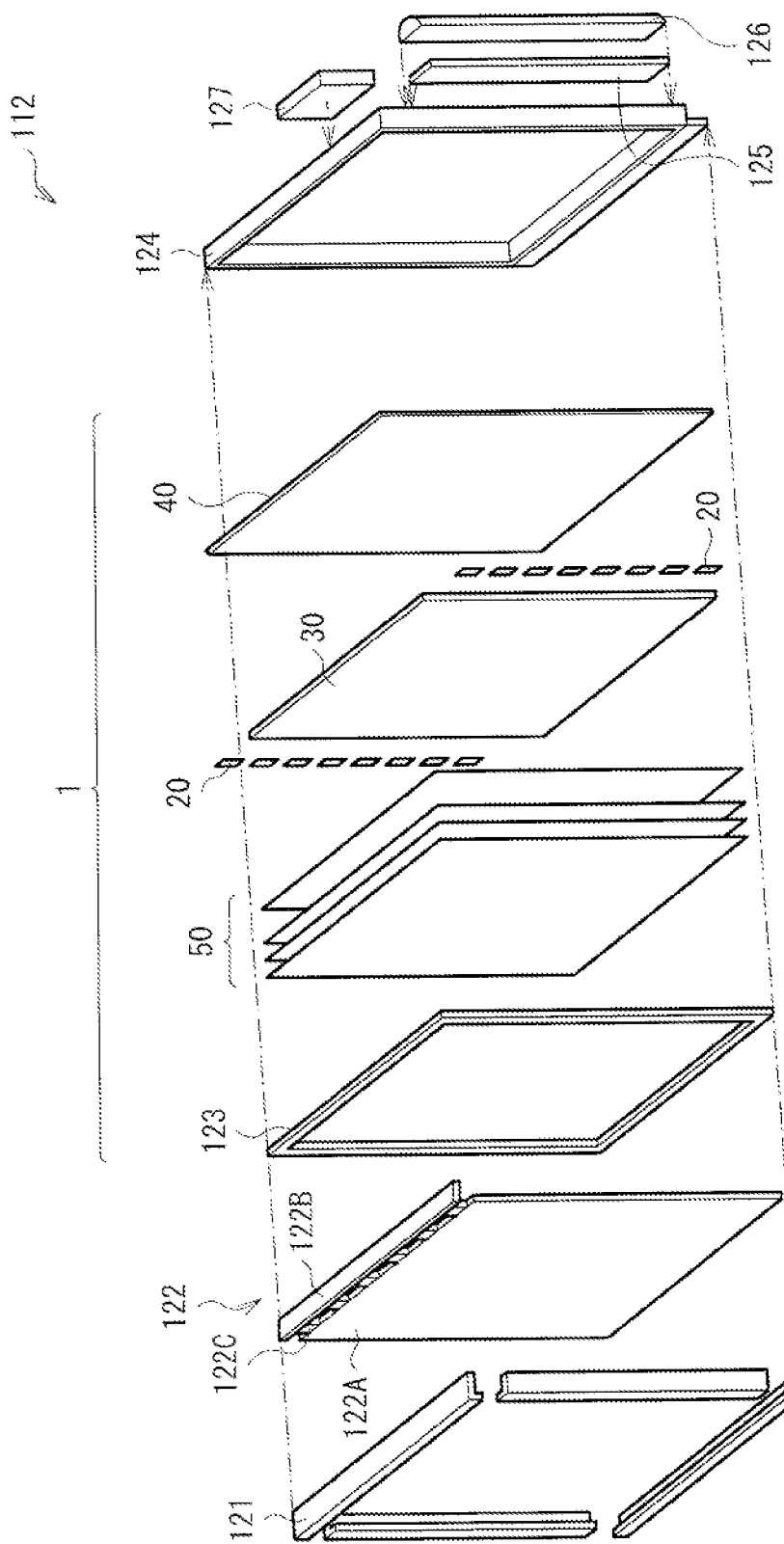
FIG. 7 is a perspective diagram illustrating a panel module illustrated in FIG. 6 in an exploded manner.

FIG. 7 illustrates the panel module 112 illustrated in FIG. 6 in an exploded manner. For example, the panel module 112 may include a top chassis 121, the liquid crystal panel 122, a frame-like component (middle chassis) 123, optical sheets 50, a light guide plate 30, a reflective component 40, a back chassis 124, a balancer substrate 125, a balancer cover 126, and a timing controller substrate 127 in this order from the front side (viewer side).

The top chassis 121 is a frame-like metal component covering the front periphery of the liquid crystal panel 122. For example, the liquid crystal panel 122 may include a liquid crystal cell 122A, a source substrate 122B, and a flexible substrate 122C such as chip on film (COF) connecting the liquid crystal cell 122A to the source substrate 122B. The frame-like component 123 is a frame-like resin component holding the liquid crystal panel 122 and the optical sheets 50. The back chassis 124 is a metal component configured of iron (Fe) or the like, which accommodates the liquid crystal panel 122, the frame-like component 123, and the light emitting unit 1. The balancer substrate 125 controls the light emitting unit 1, and is mounted on the back of the back chassis 124 and covered with the balancer cover 126 as illustrated in FIG. 7. The timing controller substrate 127 is also mounted on the back of the back chassis 124.

In the display unit 101, light from the light emitting unit 1 is selectively transmitted by the liquid crystal panel 122, thereby image display is performed. Since the display unit 101 includes the light emitting unit 1 that is improved in color uniformity in a plane and is excellent in luminous efficiency and luminous color purity as described in the first embodiment, display quality of the display unit 101 is improved.

Although the third embodiment has been described on a case where the display unit 101 includes the light emitting unit 1 according to the first embodiment, the display unit 101 may include one of the light emitting unit 1A as the modification of the first embodiment and the light emitting unit 2 according to the second embodiment in place of the light emitting unit 1.

<Application Examples of Display Unit>

Application examples of the display unit 101 as described above to electronic apparatuses are now described. Examples of the electronic apparatuses may include a television unit, a digital camera, a notebook personal computer, a mobile terminal device such as a mobile phone, and a video camcorder. In other words, the display unit is applicable to electronic apparatuses in various fields for displaying externally-received or internally-generated image signals as still or video images.

Application Example 1

Figure 8A:
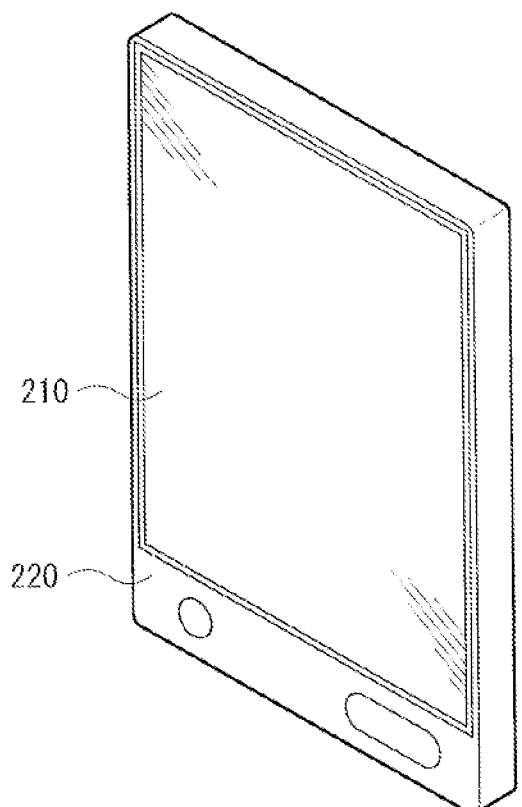
FIG. 8A is a perspective diagram illustrating appearance of an electronic book (application example 1) in which the display unit according to an embodiment of the present disclosure is mounted.
Figure 8B:
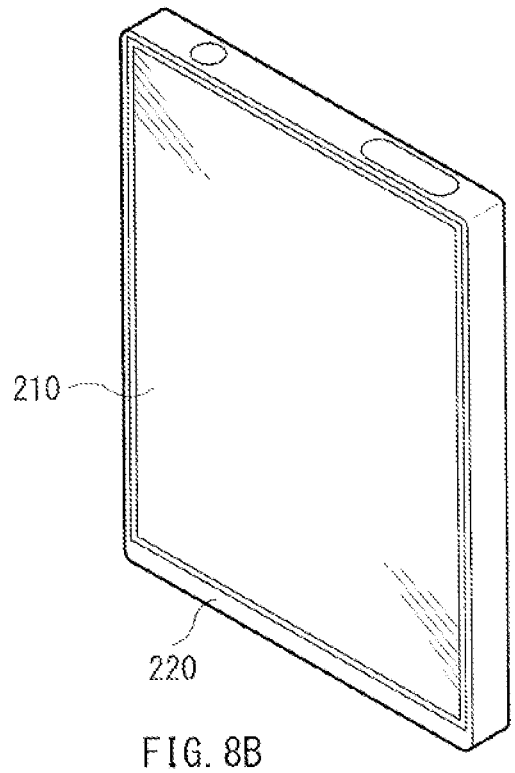
FIG. 8B is a perspective diagram illustrating appearance of another electronic book (application example 1) in which the display unit according to an embodiment of the present disclosure is mounted.

FIG. 8A illustrates appearance of an electronic book to which the display unit 101 according to the third embodiment is applied. FIG. 8B illustrates appearance of another electronic book to which the display unit 101 according to the third embodiment is applied. Such electronic books may each have, for example, a display section 210, a non-display section 220. The display section 210 may be configured of the display unit 101 according to the third embodiment.

Application Example 2

Figure 9:
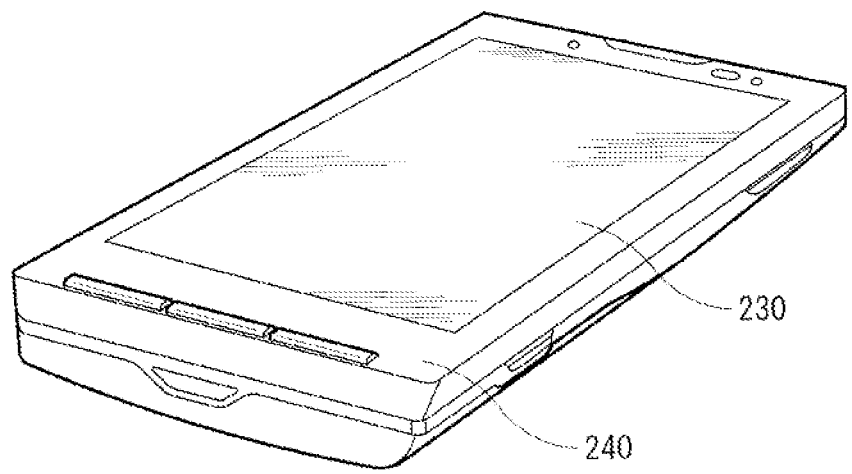
FIG. 9 is a perspective diagram illustrating appearance of a smartphone (application example 2) in which the display unit according to an embodiment of the present disclosure is mounted.

FIG. 9 illustrates appearance of a smartphone to which the display unit 101 according to the third embodiment is applied. The smartphone may have, for example, a display section 230 and a non-display section 240. The display section 230 may be configured of the display unit 101 according to the third embodiment.

Application Example 3

Figure 10A:
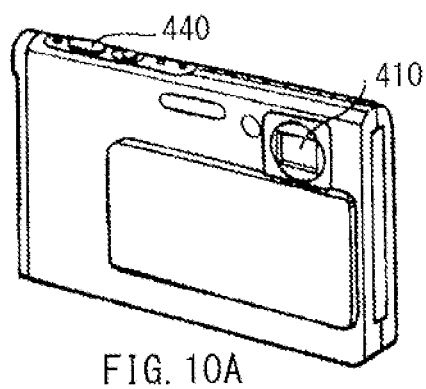
FIG. 10A is a perspective diagram illustrating appearance of a digital camera (application example 3), in which the display unit according to an embodiment of the present disclosure is mounted, as viewed from a front side.
Figure 10B:
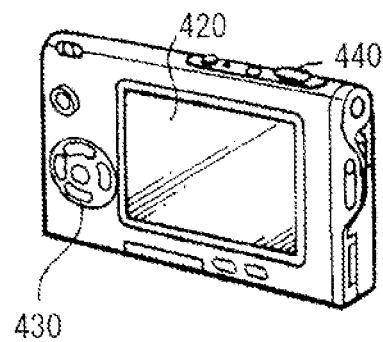
FIG. 10B is a perspective diagram illustrating appearance of the digital camera (application example 3), in which the display unit according to an embodiment of the present disclosure is mounted, as viewed from a back side.

FIGS. 10A and 10B each illustrate appearance of a digital camera to which the display unit 101 according to the third embodiment is applied. FIG. 10A illustrates appearance of the digital camera as viewed from a front side (an object side) thereof. FIG. 10B illustrates appearance of the digital camera as viewed from a back side (an image side) thereof. The digital camera may have, for example, a light emitting section 410 for flash, a display section 420, a menu switch 430, and a shutter button 440. The display section 420 may be configured of the display unit 101 according to the third embodiment.

Application Example 4

Figure 11:
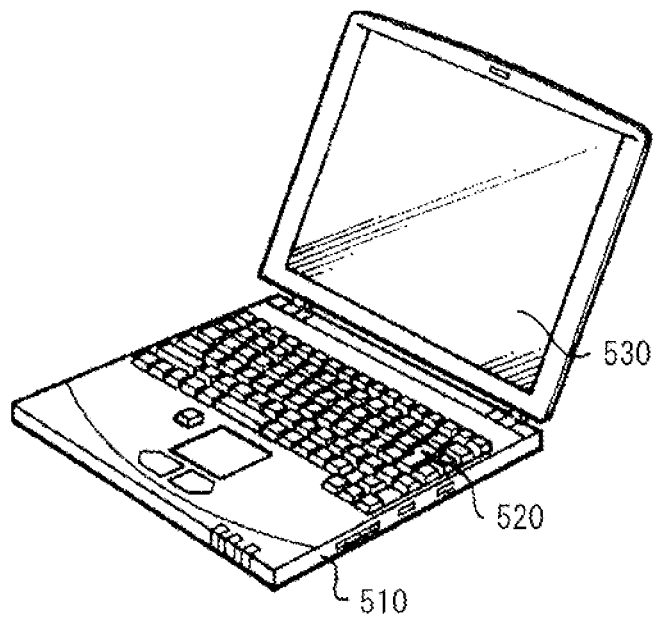
FIG. 11 is a perspective diagram illustrating appearance of a notebook personal computer (application example 4) in which the display unit according to an embodiment of the present disclosure is mounted.

FIG. 11 illustrates appearance of a notebook personal computer to which the display unit 101 according to the third embodiment is applied. The notebook personal computer may have, for example, a main body 510, a keyboard 520 for input operation of characters and the like, and a display section 530 that displays images. The display section 530 may be configured of the display unit 101 according to the third embodiment.

Application Example 5

Figure 12:
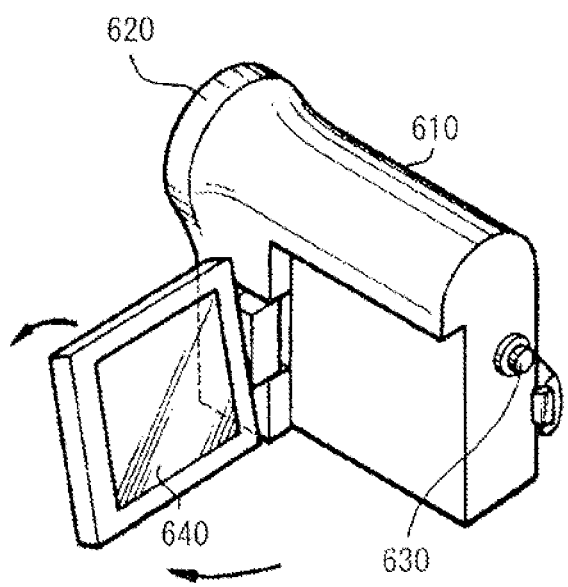
FIG. 12 is a perspective diagram illustrating appearance of a video camcorder (application example 5) in which the display unit according to an embodiment of the present disclosure is mounted.

FIG. 12 illustrates appearance of a video camcorder to which the display unit 101 according to the third embodiment is applied. The video camcorder may have, for example, a main body section 610, an object-shooting lens 620 provided on a front side face of the main body section 610, a start/stop switch 630 for shooting, and a display section 640. The display section 640 may be configured of the display unit 101 according to the third embodiment.

Application Example 6

Figure 13A:
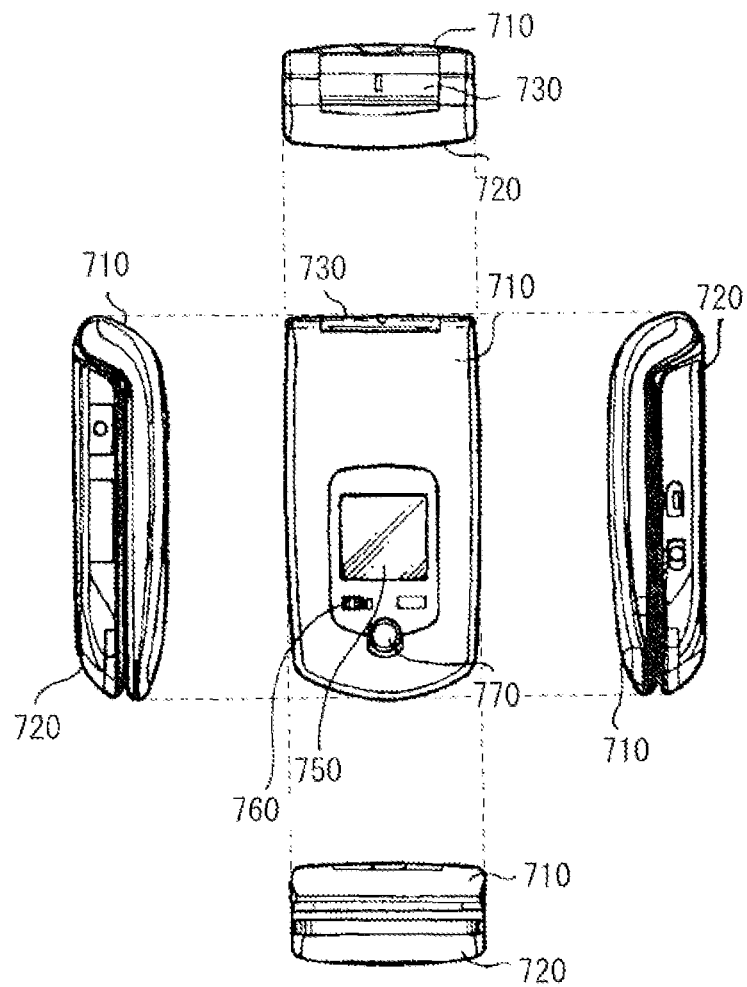
FIG. 13A includes a front diagram, a left side diagram, a right side diagram, a top diagram, and a bottom diagram illustrating appearance of a mobile phone (application example 6) in a closed state, in which the display unit according to an embodiment of the present disclosure is mounted.
Figure 13B:
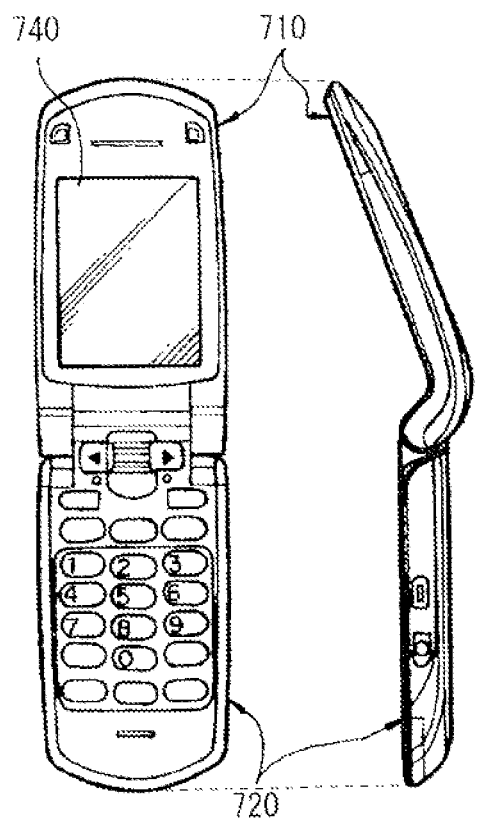
FIG. 13B includes a front diagram and a side diagram illustrating appearance of the mobile phone (application example 6) in an opened state, in which the display unit according to an embodiment of the present disclosure is mounted.

FIGS. 13A and 13B each illustrate appearance of a mobile phone to which the display unit 101 according to the third embodiment is applied. For example, the mobile phone may be configured of an upper housing 710 and a lower housing 720 connected to each other by a hinge section 730, and may have a display 740, a sub display 750, a picture light 760, and a camera 770. The display 740 or the sub display 750 may be configured of the display unit 101 according to the third embodiment.

<Application Examples of Lighting Unit>

Figure 14:
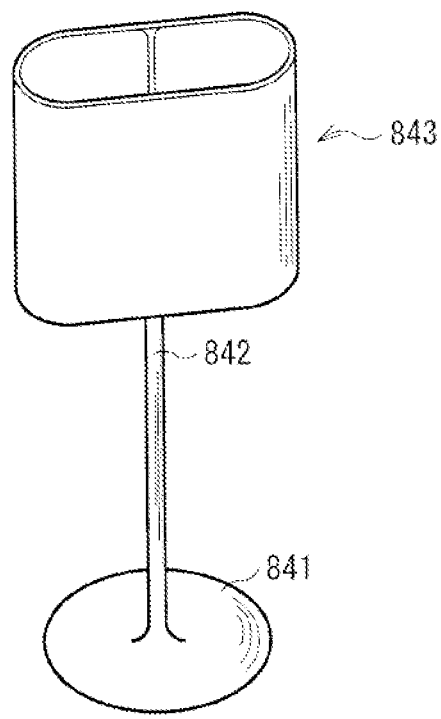
FIG. 14 is a perspective diagram illustrating appearance of a first lighting unit (application example 7) having a light emitting unit according to an embodiment of the present disclosure.
Figure 15:
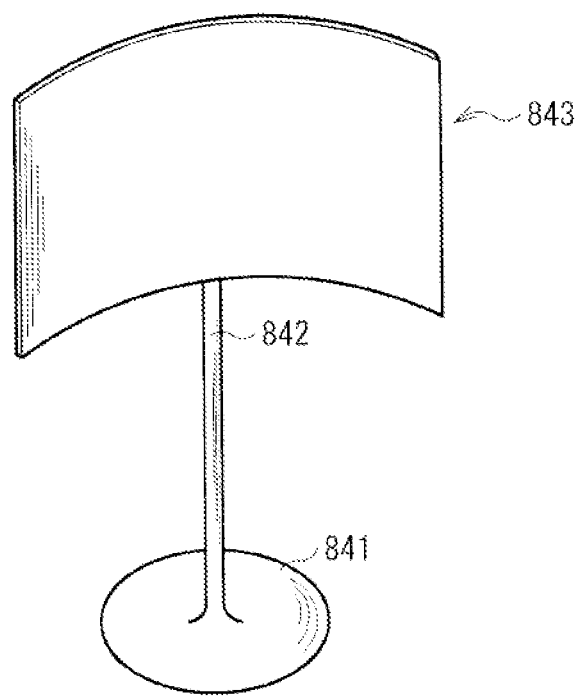
FIG. 15 is a perspective diagram illustrating appearance of a second lighting unit (application example 8) having the light emitting unit according to an embodiment of the present disclosure.

FIGS. 14 and 15 each illustrate appearance of a tabletop lighting unit to which one of the light emitting units 1, 1A, and 2 of the above-described embodiments is applied. For example, the lighting unit may include a lighting section 843 that is attached to a pole 842 provided on a base 841. The lighting section 843 is configured of one of the light emitting units 1, 1A, and 2 according to the first and second embodiments. The lighting section 843 is allowed to be formed into an appropriate shape, such as a cylindrical shape illustrated in FIG. 14 or a curved surface shape illustrated in FIG. 15, through formation of the light guide plate 30 into a curved shape.

Figure 16:
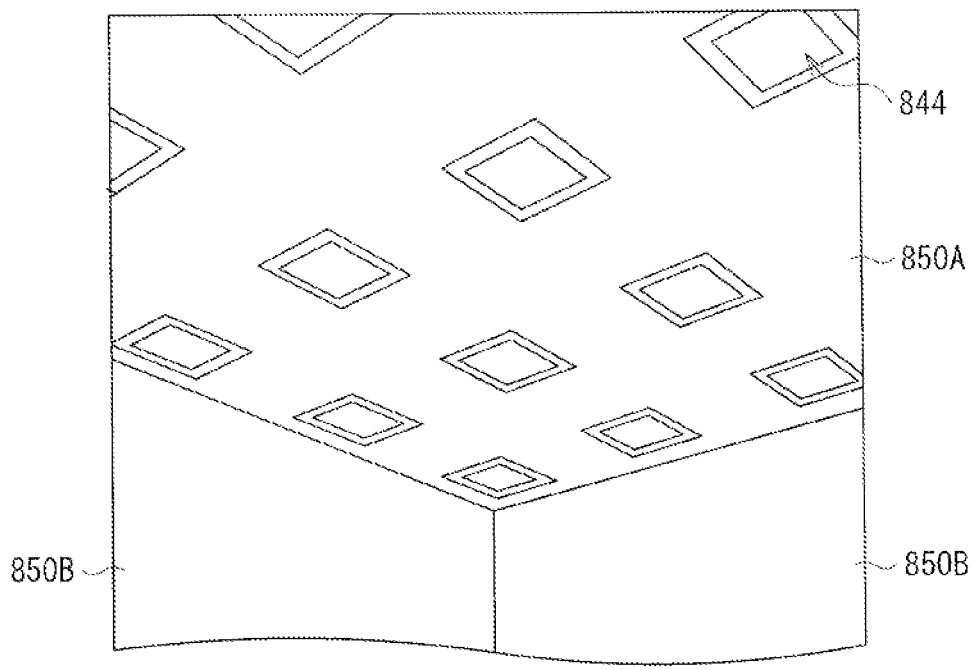
FIG. 16 is a perspective diagram illustrating appearance of a third lighting unit (application example 9) having the light emitting unit according to an embodiment of the present disclosure.

FIG. 16 illustrates appearance of an indoor lighting unit to which one of the light emitting units 1, 1A, and 2 of the above-described embodiments is applied. For example, the lighting unit includes lighting sections 844 that are each configured of one of the light emitting units 1, 1A, and 2 according to the above-described embodiments. An appropriate number of lighting sections 844 are arranged at appropriate intervals on a ceiling 850A of a building. The lighting sections 844 may be provided not only on the ceiling 850A but also on any appropriate place such as a wall 850B or an undepicted floor depending on applications.

Such lighting units perform lighting with light from the light emitting unit 1. Since each lighting unit has one of the light emitting units 1, 1A, and 2 that are improved in color uniformity in a plane as described in the first embodiment, the lighting unit has improved lighting quality.

Although the present disclosure has been described with the example embodiments hereinbefore, the disclosure is not limited thereto, and various modifications or alterations thereof may be made. For example, while the material and the thickness of each layer have been described in the example embodiments, these are not limitative. In other words, other materials and thicknesses may be used. Although description has been made on an exemplary case where blue light is wavelength-converted into white light by the first and second phosphor sheets 13 and 15, this is not limitative.

For example, while the above-described embodiments have been described with a case where the light source 20 is configured of LED, the light source 20 may be configured of a semiconductor laser or the like.

Furthermore, although the example embodiments have been described with specific configurations of the light emitting units 1, 1A, and 2 and the display unit 101 (television unit), all of the illustrated components are not necessary to be provided, or another component may be provided.

It is possible to achieve at least the following configurations from the above-described example embodiments of the disclosure.

(1) A phosphor sheet, including:
a stacked structure including a first phosphor layer and a pair of transparent films each being in contact with either side of the first phosphor layer;
a seal layer integrally covering an area from an end face of the stacked structure to a periphery of the stacked structure; and
a second phosphor layer further covering a portion of the seal layer, the portion covering at least the periphery of the stacked structure.

(2) The phosphor sheet according to (1), further including a light reflecting layer between the seal layer and the second phosphor layer.

(3) The phosphor sheet according to (1) or (2), wherein the first and second phosphor layers are configured to emit white light when irradiated with blue light.

(4) The phosphor sheet according to any one of (1) to (3), wherein the first phosphor layer contains a sulfide phosphor, and
the second phosphor layer contains a yttrium-aluminum-garnet (YAG) phosphor.

(5) The phosphor sheet according to any one of (1) to (4), wherein the second phosphor layer is provided on a portion of the seal layer, the portion covering one of the pair of transparent films.

(6) The phosphor sheet according to any one of (1) to (5), wherein the pair of transparent films are configured of a moistureproof resin.

(7) The phosphor sheet according to any one of (1) to (6), wherein the seal layer is configured of aluminum.

(8) A light emitting unit, including:
a light source;
a light guide plate having a first main surface and a second main surface opposed to each other, and an end face connecting the first main surface to the second main surface and being opposed to the light source; and
a phosphor sheet opposed to the first main surface of the light guide plate,
wherein the phosphor sheet includes
a stacked structure including a first phosphor layer and a pair of transparent films each being in contact with either side of the first phosphor layer,
a seal layer integrally covering an area from an end face of the stacked structure to a periphery of the stacked structure, and
a second phosphor layer further covering a portion of the seal layer, the portion covering at least the periphery of the stacked structure.

(9) The light emitting unit according to (8), wherein the light source includes a light emitting diode configured to emit blue light, and the first and second phosphor layers are configured to emit white light when irradiated with blue light from the light source.

(10) The light emitting unit according to (8) or (9), further including a reflecting component opposed to the second main surface of the light guide plate.

(11) A display unit, including:
a liquid crystal panel; and a light emitting unit disposed to be opposed to a back of the liquid crystal panel,
wherein the light emitting unit includes
a light source,
a light guide plate having a first main surface and a second main surface opposed to each other, and an end face connecting the first main surface to the second main surface and being opposed to the light source, and
a phosphor sheet opposed to the first main surface of the light guide plate, wherein the phosphor sheet includes
a stacked structure including a first phosphor layer and a pair of transparent films each being in contact with either side of the first phosphor layer,
a seal layer integrally covering an area from an end face of the stacked structure to a periphery of the stacked structure, and
a second phosphor layer further covering a portion of the seal layer, the portion covering at least the periphery of the stacked structure.

It should be understood by those skilled in the art that various modifications, combinations, sub-combinations and alterations may occur depending on design requirements and other factors insofar as they are within the scope of the appended claims or the equivalents thereof.

What is claimed is:

1. A light emitting unit, comprising:
a light source;
a light guide plate having a first main surface and a second main surface opposed to each other, and an end face connecting the first main surface to the second main surface and being opposed to the light source; and
a phosphor sheet opposed to the first main surface of the light guide plate,
wherein the phosphor sheet includes
a stacked structure including a first phosphor layer and a pair of transparent films each being in contact with either side of the first phosphor layer, wherein marginal portions comprise a marginal portion protruded from the first phosphor layer and provided on an outer edge of each of the pair of transparent films, and the marginal portions are fused to each other to seal the first phosphor layer,
a seal layer integrally covering an area from an end face of the stacked structure to a periphery of the stacked structure so as to leave another area of the stacked structure uncovered by the seal layer, and
a second phosphor layer arranged on at least a portion of an outer surface of the seal layer which covers one transparent film within the pair of transparent films at the periphery of the stacked structure.

2. The light emitting unit according to claim 1, wherein the first and second phosphor layers are configured to emit white light when irradiated with blue light.

3. The light emitting unit according to claim 1, wherein the first phosphor layer contains a sulfide phosphor, and the second phosphor layer contains a yttrium-aluminum-garnet (YAG) phosphor.

4. The light emitting unit according to claim 1, wherein the pair of transparent films are configured of a moisture-proof resin.

5. The light emitting unit according to claim 1, wherein the seal layer is configured of aluminum.

6. The light emitting unit according to claim 1, wherein the light source includes a light emitting diode configured to emit blue light, and the first and second phosphor layers are configured to emit white light when irradiated with blue light from the light source.

7. The light emitting unit according to claim 1, further comprising a reflecting component opposed to the second main surface of the light guide plate.

8. A display unit, comprising:
a liquid crystal panel; and
a light emitting unit disposed to be opposed to a back of the liquid crystal panel,
wherein the light emitting unit includes
a light source,
a light guide plate having a first main surface and a second main surface opposed to each other, and an end face connecting the first main surface to the second main surface and being opposed to the light source, and
a phosphor sheet opposed to the first main surface of the light guide plate,
wherein the phosphor sheet includes
a stacked structure including a first phosphor layer and a pair of transparent films each being in contact with either side of the first phosphor layer, wherein marginal portions comprise a marginal portion protruded from the first phosphor layer and provided on an outer edge of each of the pair of transparent films, and the marginal portions are fused to each other to seal the first phosphor layer,
a seal layer integrally covering an area from an end face of the stacked structure to a periphery of the stacked structure so as to leave another area of the stacked structure uncovered by the seal layer, and
a second phosphor layer arranged on at least a portion of an outer surface of the seal layer which covers one transparent film within the pair of transparent films at the periphery of the stacked structure.

* * * * *